United States Patent
Chang

(10) Patent No.: US 9,382,146 B2
(45) Date of Patent: Jul. 5, 2016

(54) METHOD AND MOLD FOR MANUFACTURING CURVED GLASS SHEET

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 90 days.

(21) Appl. No.: 14/211,498

(22) Filed: Mar. 14, 2014

(65) Prior Publication Data

US 2014/0290309 A1 Oct. 2, 2014

(30) Foreign Application Priority Data

Mar. 28, 2013 (CN) .................. 2013 1 01027562

(51) Int. Cl.
*C03B 23/035* (2006.01)
(52) U.S. Cl.
CPC ......... *C03B 23/0357* (2013.01); *C03B 23/0352* (2013.01)
(58) Field of Classification Search
None
See application file for complete search history.

(56) References Cited

U.S. PATENT DOCUMENTS

| | | | |
|---|---|---|---|
| 5,383,947 A | 1/1995 | Montonen | |
| 5,992,178 A * | 11/1999 | Kuster | C03B 23/0357 65/106 |
| 2009/0117332 A1 * | 5/2009 | Ellsworth | C03B 23/0357 428/156 |
| 2009/0289380 A1 * | 11/2009 | Chisha | C03B 23/0357 264/1.1 |
| 2010/0000259 A1 | 1/2010 | Ukrainczyk | |

FOREIGN PATENT DOCUMENTS

| | | |
|---|---|---|
| CN | 1657501 A | 8/2005 |
| CN | 1978352 A * | 6/2007 |
| CN | 102115306 A | 7/2011 |
| JP | 10-182176 A | 7/1998 |
| TW | 201226343 A1 | 7/2012 |

OTHER PUBLICATIONS

CN1978352A Machine Translation Performed by Google Patents Oct. 16, 2015.*
TW2012263343—Machine Translation Performed TIPO Website Feb. 23, 2016.*

* cited by examiner

*Primary Examiner* — Lisa Herring
(74) *Attorney, Agent, or Firm* — ScienBiziP, P.C.

(57) ABSTRACT

A mold includes a first mold, an second mold located upon the first mold, and a mold core located between the first mold and the second mold. The first mold defines a receiving space, and comprises a bottom surface in the receiving space. The bottom surface in the receiving space defines at least one guiding groove. A bottom surface in the at least one guiding groove defines at least one air outlet. The mold core is received in the receiving space and supported by the bottom surface in the receiving space. The mold core defines a mold cavity and a plurality of micro-holes communicating with the mold cavity and the at least one guiding groove.

6 Claims, 7 Drawing Sheets

METHOD AND MOLD FOR MANUFACTURING CURVED GLASS SHEET

FIELD

The present disclosure generally relates to a method and a mold for manufacturing a glass sheet, and particularly to a method and a mold for manufacturing a curved glass sheet.

BACKGROUND

In recent years, curved glass sheets are employed as glazing display panels in electronic devices such as mobile phones. Such curved glass sheets are conventionally produced by gravity bending methods. In a typical gravity bending method, a raw glass sheet is heated to a temperature which is equal to or higher than a glass transition temperature of the raw glass sheet, and then the glass sheet is conveyed to a first mold having an inner concave surface. The raw glass sheet is pressed to the inner concave surface by gravity to form the curved glass sheet. However, in the gravity bending method, a profile deviation of the curved glass sheet is unduly great. In order to reduce the profile deviation of the curved glass sheet, the gravity bent glass sheet supported by the first mold is further pressed by an second mold to a desired shape. However, because the inner concave surface of the curved glass sheet contacts the second mold, and an outer convex surface of the obtained curved glass sheet contacts the first mold, a roughness of the inner and outer concave surfaces of the curved glass sheet is relatively high. Additionally, defects on the surfaces of the curved glass sheet are increased due to the contact between the molds and the surfaces of the glass sheet.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the method for manufacturing curved glass sheet and the mold employed in the same. Moreover, in the drawings like reference numerals designate corresponding parts throughout the several views. Wherever possible, the same reference numerals are used throughout the drawings to refer to the same or like elements of an embodiment.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
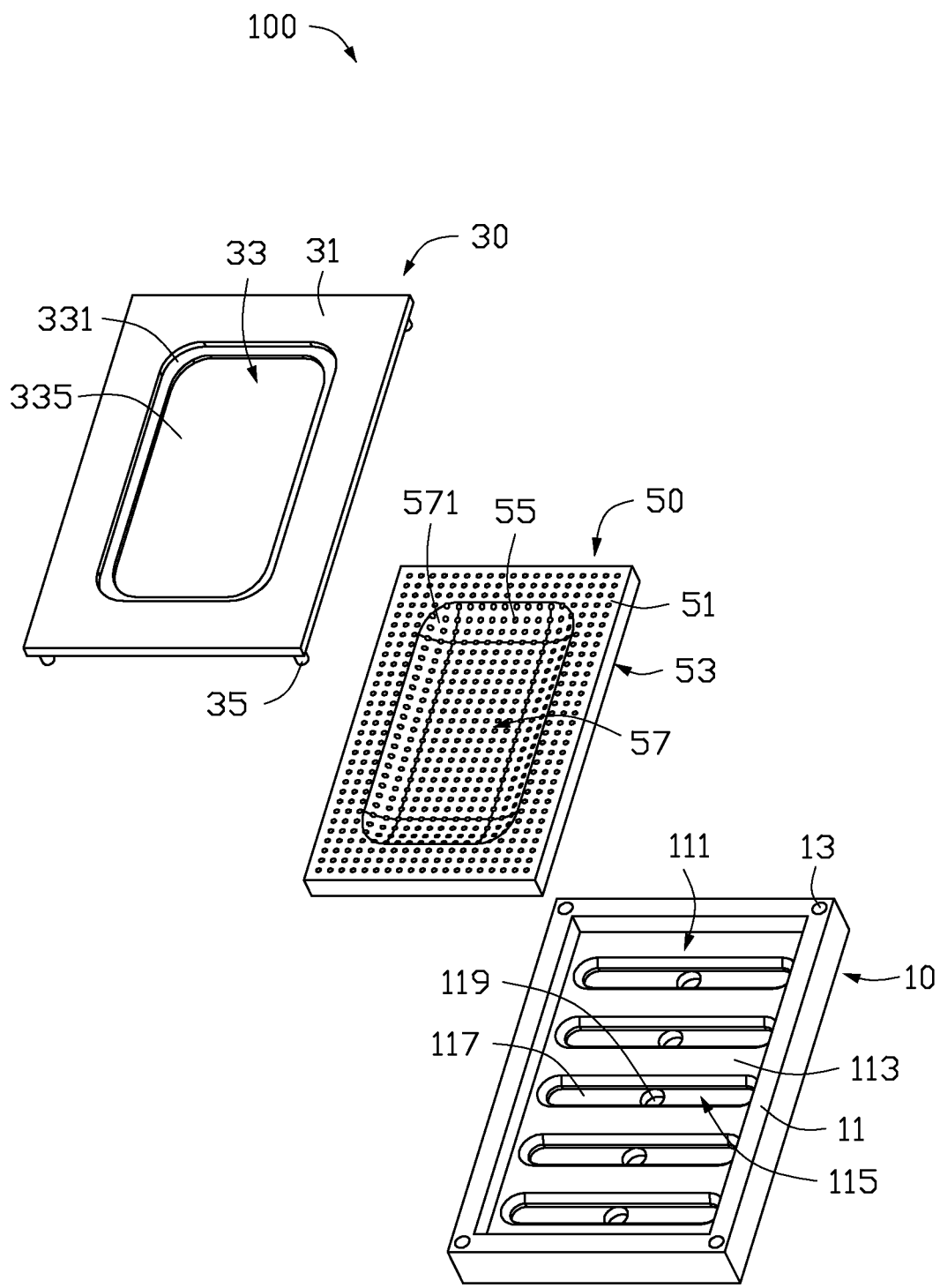
FIG. 1 shows an exploded, isometric view of an embodiment of a mold, including a mold core.
Figure 2:
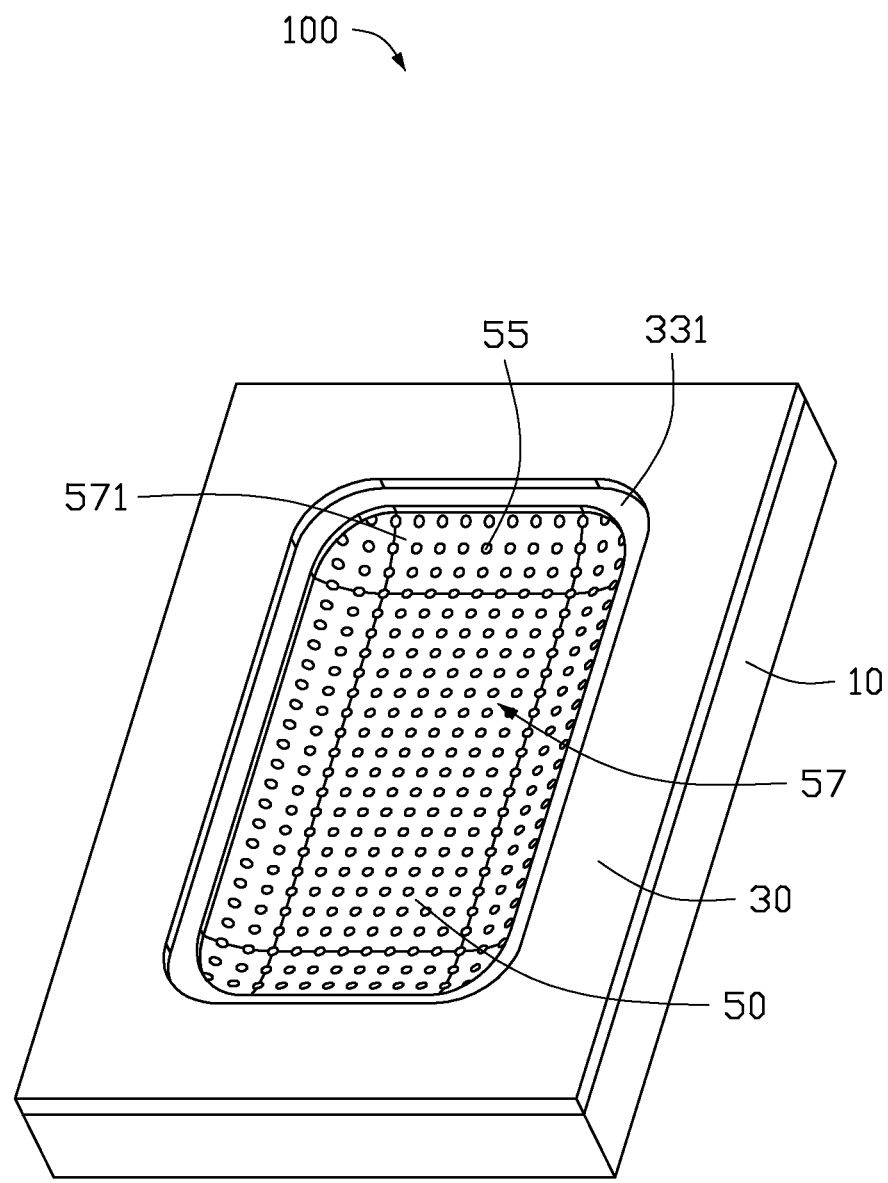
FIG. 2 shows an assembled, isometric view of the mold of FIG. 1.
Figure 4:
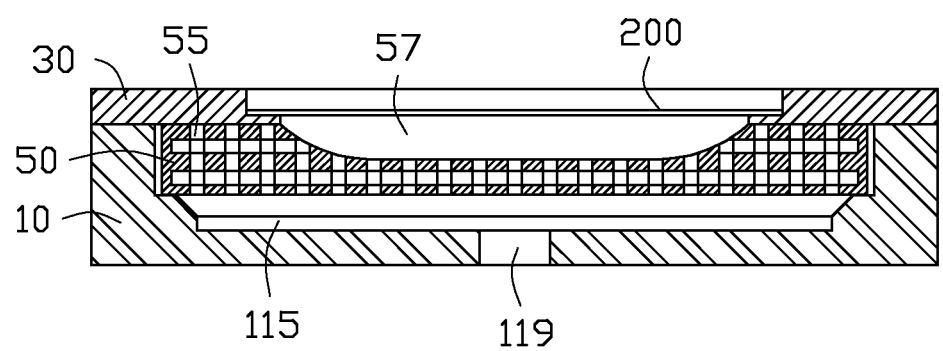
FIG. 4 shows a cross-section of the mold of FIG. 1 in a first state of use.
Figure 5:
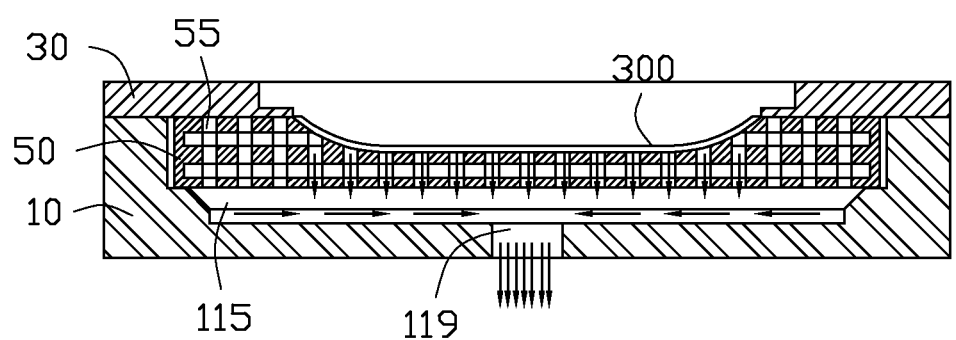
FIG. 5 shows a cross-section of the mold of FIG. 1 in a second state of use.

FIGS. 1 and 2 show an embodiment of a mold 100 for manufacturing a curved glass sheet 300. The curved glass sheet 300 can be obtained from a raw glass sheet 200 (shown in FIG. 4). The mold 100 can include a first mold 10, an second mold 30 matching with the first mold 10, and a mold core 50 located between the first mold 10 and the second mold 30.

The first mold 10 can be substantially cuboid and can include a mounting surface 11 facing the mold core 50. The mounting surface 11 can define a receiving space 111 matching with the mold core 50 for receiving the mold core 50. A bottom surface 113 in the receiving space 111 can support the mold core 50 and can define a plurality of guiding grooves 115 spaced from each other. A bottom surface 117 (see FIG. 1) in each guiding groove 115 can define an air outlet 119 communicating with the receiving space 111. In an illustrated embodiment, five guiding grooves 115 are defined in the bottom surface 113. Each of four corners of the mounting surface 11 can define an aligning hole 13, for positioning the second mold 30.

The second mold 30 can be substantially rectangular and plate-like and can include a mounting surface 31 away from the first mold 10. The mounting surface 31 can define a receiving groove 33 in a substantially center portion for receiving the raw glass sheet 200. A support surface 331 can be formed in the receiving groove 33 for supporting the raw glass sheet 200. An opening 335 can be defined in a center portion of the support surface 331. The opening 335 can be substantially rectangular, and corners of the opening 335 can be chamfered. The second mold 30 can further include a plurality of positioning posts 35 at corners of the second mold 30 towards the first mold 10. Each positioning post 35 can correspond to one aligning hole 13, such that each positioning post 35 can be inserted into the corresponding aligning hole 13 for positioning the second mold 30. In other embodiments, the receiving groove 33 can be omitted, such that the opening 335 is directly defined in the mounting surface 31, and the raw glass sheet 200 is placed directly on the mounting surface 31 covering the opening 335. In the illustrated embodiment, the support surface 331 is substantially parallel to the mounting surface 31. In other embodiments, the support surface 331 can be a planar surface or curved surface inclined to the mounting surface 31.

The mold core 50 can be substantially cuboid, and can be made of composite ceramic in which B content (wt %) and N content (wt %) is higher than 70%. In other embodiments, the mold core 50 can also be made of ceramic fiber, such as Si—B—N ceramic fiber. The mold core 50 can be received in the receiving space 111, and can include a first surface 51 and a second surface 53 opposite to the first surface 51. The first surface 51 can face to the second mold 30. The second surface 53 can face to the first mold 10. A plurality of through micro-holes 55 can be defined through the first surface 51 and the second surface 53, such that the opening 335 can be in communication with the guiding grooves 115. The diameter of each micro-hole 55 can be smaller than about 1 mm. In the illustrated embodiment, the diameter of each micro-hole can be about 0.3 mm. The first surface 51 can define a mold cavity 57 corresponding to the opening 335. A shape of the mold cavity 57 can match with a shape of the curved glass sheet 300. In the illustrated embodiment, a bottom surface 571 in the mold cavity 57 can be an arc. The micro-holes 55 can extend along crisscross directions, and the micro-holes 55 can be arranged in a matrix. In the illustrated embodiment, a shape of the mold core 50 matches with the receiving space 111, so that when the second mold 30 is positioned on the first mold 10, the second mold 30 contacts with the first surface 51 of the mold core 50. In other embodiments, the micro-holes 55 can be defined only corresponding to mold cavity 57. The diameter of each micro-hole 55 can be changed, for example the diameter can be 0.5 mm.

In assembly, the mold core 50 can be received in the receiving space 111 and mounted on the bottom surface 113, and can be located on a side of the guiding grooves 115 away from the air outlet 119. The side surface of the second mold 30 opposite to the mounting surface 31 can contact the mounting surface 11 of the first mold 10 and the first surface 51 of the mold core 50. The positioning posts 35 can be inserted into the corresponding positioning holes 13. The opening 335 of the second mold 30 can be communicated to the guiding grooves 115 of the first mold 10 via the micro-holes 55.

Figure 3:
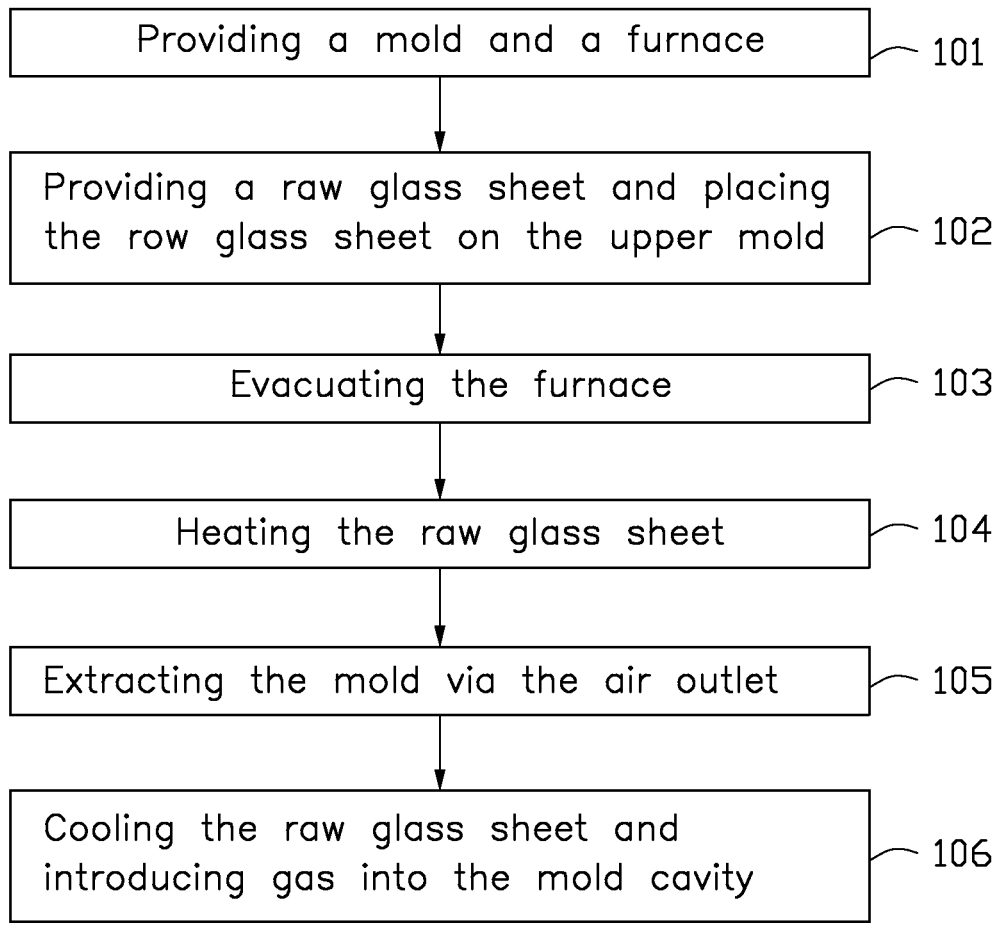
FIG. 3 is a flowchart showing a method for manufacturing a curved glass sheet using the mold of FIG. 1.

FIG. 3 shows an embodiment of a method for manufacturing the curved glass sheet employing a mold, which can be as described above, with the raw glass sheet.

In 101, the mold described as above and a furnace (not shown) are provided. A temperature in the furnace can be controlled.

In 102, the raw glass sheet (shown in FIG. 4) can be provided and placed on the support surface of the second mold, and can cover the opening of the second mold. In 102, the mold can be in a first state of use.

In 103, the furnace can be evacuated to be in a substantially vacuum state, and then protective gas can be introduced into the furnace. In the illustrated embodiment, the protective gas is nitrogen gas.

In 104, the temperature in the furnace can be controlled, and the raw glass sheet can be heated to a temperature about the glass transition temperature of the raw glass sheet. In the illustrated embodiment, a temperature difference between the heated temperature of the raw glass sheet and the glass transition temperature of the raw glass sheet is smaller than or equal to about Celsius degrees.

In 105, the mold can be extracted via the air outlet of the first mold, such that a side of the raw glass sheet adjacent to the first mold forms a zone of negative pressure, an opposite side of the raw glass sheet away from the first mold forms a zone of positive pressure. Thus, the raw glass sheet can be bent and adhered to the bottom surface of the mold cavity. In 105, the mold can be in a second state of use. There can be many guiding grooves evenly defined in the bottom surface of the receiving space, such that when extracting the mold via the outlet, the gas in the mold cavity can be evenly extracted via the micro-holes and the guiding grooves. Thus, stress can be uniformly applied on the raw glass sheet, and the raw glass sheet can bend until tightly adhered to the bottom surface of the mold cavity. In addition, the micro-holes can extend crisscrossing, such that the zone of negative pressure in a side of the raw glass sheet adjacent to the first mold can be quickly formed.

Figure 6:
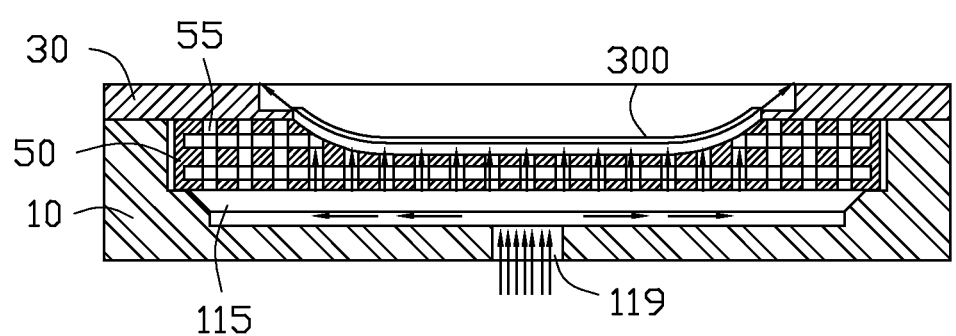
FIG. 6 shows a cross-section of the mold of FIG. 1 in a third state of use.

In 106, after the raw glass sheet is cooled, gas can be introduced into the mold cavity via the outlet, and the mold can be in a third state of use (shown in FIG. 6). Then, the mold can be taken out from the furnace, and the curved glass sheet can be obtained.

Figure 7:
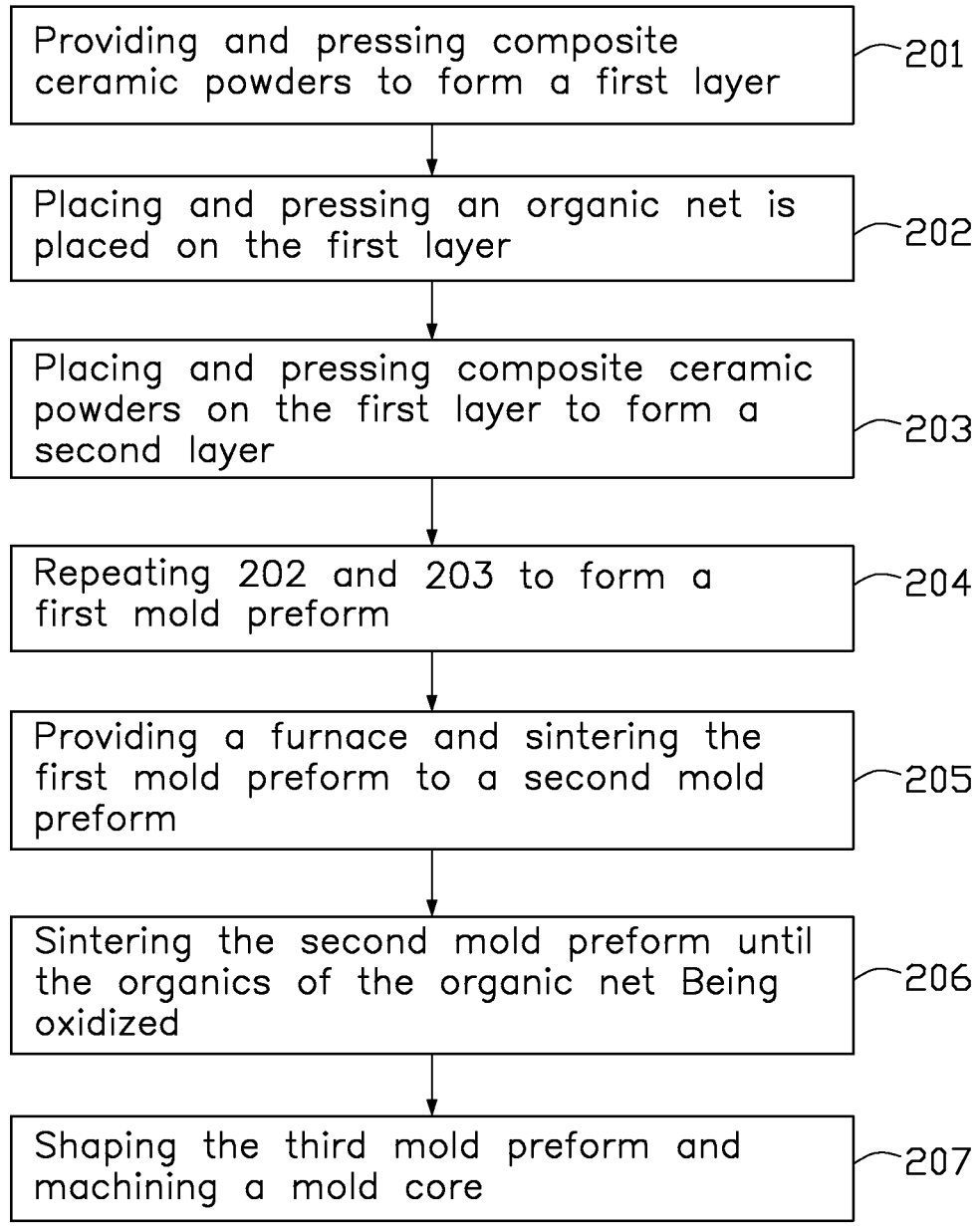
FIG. 7 is a flowchart showing a method for manufacturing the mold core of the mold of FIG. 1.

FIG. 7 shows an embodiment of a method for manufacturing the mold of the embodiment is illustrated as follows.

In 201, composite ceramic powders can be provided as raw material, and can be pressed to form a first layer. B content (wt %) and N content (wt %) of the composite ceramic powders is higher than 70%.

In 202, an organic net can be placed on the first layer of the composite ceramic powders, and can be pressed. In the illustrated embodiment, the diameter of each organic line of the organic net is about 0.3 mm. In other embodiments, the diameter of each organic line of the organic net can be about 0.5 mm.

In 203, composite ceramic powders can be placed on the organic net and pressed to form a second layer.

In 204, 202 and 203 can be repeated, and the composite ceramic powders can be pressed to be a predetermined thickness, such that a first preformed mold can be obtained.

In 205, a furnace can be provided, and the first preformed perform can be sintered to form a second preformed mold.

In 206, the second preformed mold can be sintered in an atmosphere of air or oxygen, and thus the organics of the organic net can be oxidized, such that a third preformed mold with a plurality of micro-holes in matrix can be formed. In the illustrated embodiment, a sintered temperature of second preformed mold is 700 Celsius degrees. The diameter of each micro-hole can be about 0.3 mm.

In 207, the exterior of the third preformed mold can be shaped, and a mold cavity corresponding to the curved glass sheet can be machined, thus, forming the mold core.

In an alternative embodiment, a number of the guiding grooves can be one or more than one, and a number of the air outlet corresponding to each guiding groove can be one or more than one. The raw glass sheet can be directly put on the first surface of the mold core during manufacturing the curved glass sheet. When a profile of the curved glass sheet is not so important, the guiding grooves can be omitted, and the air outlets can be directly defined in the bottom surface received in the receiving space.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A mold for manufacturing curved glass sheet, comprising:
a first mold defining a receiving space and comprising a bottom surface in the receiving space; the bottom surface in the receiving space defining at least one guiding groove, the at least one guiding groove defining at least one air outlet at a bottom received in the at least one guiding groove;
a second mold located upon the first mold; and
a mold core located between the first mold and the second mold, the mold core being received in the receiving space, and supported by the bottom surface in the receiving space, the mold core defining a mold cavity facing the second mold and a plurality of micro-holes communicating with the mold cavity and the at least one guiding groove;
wherein the second mold defines an opening communicating with the mold cavity.

2. The mold of claim 1, wherein the second mold defines a receiving groove adjacent to the first mold, a support surface is formed in the receiving groove, and the opening is defined in the support surface.

3. The mold of claim 1, wherein the plurality of micro-holes extend along crisscross directions and are arranged in a matrix.

4. The mold of claim 1, wherein a diameter of each of the plurality of micro-holes is about 0.3 mm.

5. The mold of claim 1, wherein the first mold further comprises a mounting surface facing the mold core, and the receiving space is defined in the mounting surface.

6. The mold of claim 5, wherein the mounting surface defines at least one aligning hole, the second mold comprises at least one positioning post aligned with the at least one aligning hole.

* * * * *